(12) United States Patent
Arvidson et al.

(10) Patent No.: US 10,972,959 B2
(45) Date of Patent: Apr. 6, 2021

(54) MODEL BASED PATH SELECTION IN A BLUETOOTH LOW ENERGY, BLE, MESH NETWORK

(71) Applicant: Telefonaktiebolaget LM Ericsson (publ), Stockholm (SE)

(72) Inventors: Pontus Arvidson, Sollentuna (SE); Piergiuseppe di Marco, Sollentuna (SE); Per Skillermark, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 95 days.

(21) Appl. No.: 16/093,214

(22) PCT Filed: Sep. 18, 2018

(86) PCT No.: PCT/EP2018/075163
§ 371 (c)(1),
(2) Date: Oct. 12, 2018

(87) PCT Pub. No.: WO2020/057724
PCT Pub. Date: Mar. 26, 2020

(65) Prior Publication Data
US 2020/0092791 A1    Mar. 19, 2020

(51) Int. Cl.
*H04W 40/24* (2009.01)
*H04L 12/751* (2013.01)
(Continued)

(52) U.S. Cl.
CPC .......... *H04W 40/246* (2013.01); *H04L 45/02* (2013.01); *H04W 40/12* (2013.01); *H04W 84/18* (2013.01)

(58) Field of Classification Search
CPC ... H04W 40/246; H04W 40/12; H04W 84/18; H04W 24/00; H04W 28/0236; H04L 45/02
See application file for complete search history.

(56) References Cited

U.S. PATENT DOCUMENTS 8,520,586 B1 * 8/2013 Husted ............... H04W 52/367
370/318
8,532,023 B2   9/2013 Buddhikot et al.
(Continued)

OTHER PUBLICATIONS

Secci, Luca, et al., "Reducing Traffic Congestion in ZigBee Networks: Experimental Results", 2013 9th International Wireless Communications and Mobile Computing Conference (IWCMC), IEEE, Jul. 2013, pp. 627-632.
(Continued)

*Primary Examiner* — Christine Ng
(74) *Attorney, Agent, or Firm* — Murphy, Bilak & Homiller, PLLC

(57) ABSTRACT

A method for supporting the establishment of a path for transmitting a message in a mesh network, wherein said message is to be transmitted from a source node in said mesh network to a destination node, via one or more intermediary nodes, in said mesh network. The method comprises the steps of receiving, by an intermediary node in said mesh network, a path discovery message originating from said source node in said mesh network, said path discovery message comprising a path quality parameter, updating, by said intermediary node, said path quality parameter based on a quality of link associated with a node from which said intermediary node received said path discovery message, and broadcasting, by said intermediary node, said path discovery message wherein said broadcasted path discovery message comprises said updated path quality parameter. A complementary method and corresponding node are also presented herein.

15 Claims, 3 Drawing Sheets

(51) Int. Cl.
*H04W 40/12* (2009.01)
*H04W 84/18* (2009.01)

(56) References Cited

U.S. PATENT DOCUMENTS

| | | | | |
|---|---|---|---|---|
| 8,665,841 | B1* | 3/2014 | Goel | H04L 69/324 370/338 |
| 8,693,365 | B1* | 4/2014 | Phillips | H04W 28/18 370/252 |
| 2006/0098608 | A1* | 5/2006 | Joshi | H04L 45/124 370/338 |
| 2007/0195702 | A1 | 8/2007 | Yuen et al. | |
| 2009/0238109 | A1* | 9/2009 | Byard | H04L 45/26 370/328 |
| 2010/0157843 | A1* | 6/2010 | Qian | H04L 41/0806 370/254 |
| 2010/0195535 | A1* | 8/2010 | Ziller | H04W 40/28 370/254 |
| 2010/0290441 | A1* | 11/2010 | Stewart | H04W 40/12 370/338 |
| 2017/0347361 | A1* | 11/2017 | Tsuboi | H04B 7/2668 |
| 2018/0139679 | A1 | 5/2018 | Åström et al. | |

OTHER PUBLICATIONS

Parissidis, Georgios, et al., "Routing metrics for Wireless Mesh Networks", Guide to Wireless Mesh Networks, Computer Communications and Networks, Springer, London, 2009, 1-36.

* cited by examiner

MODEL BASED PATH SELECTION IN A BLUETOOTH LOW ENERGY, BLE, MESH NETWORK

TECHNICAL FIELD

The present disclosure generally relates to the field of Bluetooth Low Energy, BLE, mesh networks and more specifically to a method for selecting one path between a source node and a destination node in a BLE mesh network.

BACKGROUND

Bluetooth Low Energy, BLE, is a low-power, low-rate wireless communications technology operating in the unlicensed 2.4 Giga Hertz, GHz, Industrial Scientific and Medical, ISM, band. Typically, BLE nodes are inexpensive, but also constrained in terms of memory and computational resources.

Bluetooth Mesh networking is standardized by the Bluetooth Special Interest Group, SIG, and the first release of Bluetooth Mesh was published in July 2017. The solution is based on flooding using broadcasting over a set of shared channels—the advertising channels. Other networking forwarding mechanisms, such as routing, and other data transfer methods or bearers, may be introduced in future versions of the specification.

The Bluetooth Mesh specification builds on the physical layer and the link layer of the Bluetooth Core specification, and these layers are implemented in the BLE controller. Higher layers, like the Bluetooth Mesh network and transport layers, are defined in the Bluetooth Mesh specification and would typically be implemented in the host.

A node acting as a relay node in a Bluetooth mesh network scans for mesh messages. When a message is detected and received the node checks if it is the destination of the message. The message is later forwarded in the mesh network by re-transmitting it so that the neighbours of the node can receive it. By means of this distributed mechanism the message is forwarded from node to node(s) in the network so that the message arrives at the destination.

The 1.0 version of the Bluetooth mesh specification allows packets to traverse through the mesh network by means of what is referred to as flooding. This essentially means that all packets will be forwarded by all relays until the packet eventually reaches its destination. This method has some obvious drawbacks, mainly in terms of caused interference and energy performance, especially as the level of traffic in the network increases.

Subsequent versions of the mesh specifications are expected to implement mechanisms to limit packets to only be forwarded along specific paths towards the intended receiver(s), thus reducing the traffic congestion in directions where forwarding does not help improving the probability of successful delivery. Paths need to be ranked and then selected based on relevant metrics.

Bluetooth Mesh has a number of characteristics that make it different from other mesh technologies that, in turn, make it difficult to select an optimal path using existing methods. Some of these characteristics are the following:
- Links are unreliable, that is, successfully received messages are not acknowledged by the recipient. This means that any method that assumes an acknowledged link may not be applied to Bluetooth mesh
- In a Bluetooth mesh network, it is expected that the node population contains nodes with large variations in node capabilities, ranging from laptops and smartphones to sensors powered by coin cell batteries. These nodes may have significant differences in receiver sensitivities which is something that many existing methods do not account for.
- Bluetooth Mesh utilizes a contention-based MAC scheme that does not involve any collision avoidance methods, such as "listen before talk" as used by Wi-Fi. This means that there is a significant risk for on-air collisions which can greatly affect the quality of a link.
- Bluetooth Mesh relies on packet repetitions to increase the reliability of the system. The number of repetitions to use for a transmission is selected by the transmitting node. This makes the number of packet repetitions a crucial parameter to determine the quality of a link. Conventional methods of path discovery typically do not take this into account.

Most existing methods typically aim to minimize the number of hops to traverse the mesh network from source to destination or to simply choose the links based on channel quality measurements, such as RSSI. Neither of these metrics provide the full picture of the link candidates in order to be able to choose a link that is optimal, in the sense of largest data delivery rate.

In order to include data delivery rate, a widely used metric in mesh networking is the Expected Transmission Count, ETX. However, ETX relies on acknowledged links, whereas Bluetooth Mesh uses unacknowledged transmissions. Therefore a solution involving ETX cannot be used in BLE mesh.

Known methods do not consider the possibility of receivers with different characteristics, the possibility that messages are repeated over link to increase the reception probability, and the effect of interference on the measured quality of a link.

SUMMARY

An object of the invention according to the present disclosure is to provide information about a multi-hop path between two nodes in a mesh network such that the multi-hop path relates well to the actual performance of the path.

Another object of the invention according to the present disclosure is to provide a method a path selection in networks comprising nodes with different receiver characteristics deployed in the same network. The method may also be implementable in networks with unacknowledged links.

In a first aspect of the invention, there is presented a method for supporting the establishment of a path for transmitting a message in a mesh network, wherein said message is to be transmitted from a source node in said mesh network to a destination node, via one or more intermediary nodes, in said mesh network. The method comprises the steps of receiving, by an intermediary node in said mesh network, a path discovery message originating from said source node in said mesh network, said path discovery message comprising a path quality parameter updating, by said intermediary node, said path quality parameter based on a quality of link associated with a node from which said intermediary node received said path discovery message, and broadcasting, by said intermediary node, said path discovery message wherein said broadcasted path discovery message comprises said updated path quality parameter.

The present disclosure introduces a method to calculate a metric to describe the quality of link that traverses an arbitrary number of hops. This metric may then, in turn, be used to choose the optimal path between two nodes in a mesh network. Thus, this method may need to be performed by every node in the mesh network. In order to establish a path between two nodes in the mesh network, the source node may broadcast a path discovery message in the mesh network.

The aim of such a path discovery message is to establish one path as the preferred path between a pair of nodes in the mesh network. The path discovery message, comprises a path quality parameter that reflects the quality of path traversed by the path discovery message so far. The intermediary node upon receiving the path discovery message updates the path quality parameter based on the last link and forwards, the path discovery message together with an updated path quality parameter.

It may be understood that any node in the mesh network, could in principle, be a destination node. The method presented in the first aspect of the present disclosure, is to be performed by a node upon determining that the node is not a destination node for the present path discovery message. When however, it is determined that the node is the destination node for the particular path discovery message, a different set of steps may need to be executed. Such steps are further elaborated in a second aspect of the present disclosure.

According to an embodiment, the step of updating comprises, determining, by said intermediary node, a Received Signal Strength Indicator, RSSI, value for said received path discovery message, updating, by said intermediary node, said path quality parameter based on said determined RSSI value.

It may be advantageous to consider that the path quality parameter is based on the RSSI value. Therefore, upon receiving a path discovery message, the intermediary node also determines the RSSI value of the incoming message. The determined RSSI value may be used to update the path quality parameter.

In an example, the step of updating further comprises retrieving, by said intermediary node, an RSSI to success probability function, wherein said function provides for a likelihood that a message is successfully received by said intermediary node over said link for a given RSSI, converting, by said intermediary node, said RSSI value to a success probability using said retrieved function, and updating, by said intermediary node, said path quality parameter based on said success probability. The node may implement said mapping in the form of a table, wherein possible RSSI values are associated with a corresponding probability of receiving a message.

It may also be considered to implement a function in each node whereby a probability of receiving an incoming message is mapped to the RSS value. Therefore, based on the determined RSSI value, a probability of receiving an incoming message may be determined. The path quality parameter may then be updated using such a determined probability of receiving the incoming message.

According to an exemplary embodiment, the step of updating further comprises measuring, by said intermediary node, a channel occupancy associated with said link, and updating, by said intermediary node, said path quality parameter based on said measured channel occupancy.

The intermediary node may, for example, also determine a channel occupancy link of the link over which the incoming message was received. This may be helpful in determining a probability of losing the message due to collisions with other messages over the same link. Such a channel occupancy parameter may be utilised with other parameters in order to determine updated path quality parameter.

According to an embodiment, the step of updating further comprises determining, by said intermediary node, a number of repetitions that will be used for said link updating, by said intermediary node, said path quality parameter based on said determined number of repetitions.

The step of determining said number of repetitions may comprise any of retrieving, by said intermediary node, said number of repetitions that will be used for said link from said path discovery message, counting, by said intermediary node, a number of repetition messages that are received across said link. The skilled person may also consider updating the path quality parameter using other relevant parameters, such as, for example, the characteristics of the receiver.

According to an embodiment, the path quality parameter is initially set to 1. The method presented in the first aspect of the disclosure combines the RSSI measurements, with a model of the receiver characteristics of each node as well as the probability off collision and the number of retransmissions into a single metric. Such a single metric may, then be used to determine an optimal path between a pair of nodes in the mesh network.

An advantage of the proposed method is that it provides information about a multi-hop path between two nodes that relates well to the actual performance of the path, with regards to packet delivery rates. Furthermore, the method may be implemented without introducing any overhead in terms of new control messages or information that would be need to be distributed through the network.

An advantage is that the method can be used in network with unacknowledged links, such as the BLE mesh network. Finally, the solution accounts for the presence of heterogeneous nodes deployed in the same network.

In a second aspect of the present disclosure, there is presented a method for determining a path for transmitting a message in a mesh network, wherein said message is to be transmitted from a source node in said mesh network to a destination node, via one or more intermediary nodes, in said mesh network.

The method comprises the steps of receiving, by said destination node, one or more path discovery messages, wherein each of said messages comprising a corresponding path quality parameter, determining, by said destination node, from said received path discovery message, that said destination node is the intended destination node, updating, by said destination node, said path quality parameters, for each of said received path discovery messages, based on a quality of link associated with a node from which said destination node received said corresponding path discovery message, selecting, by said destination node, a path from said source node to said destination node as being the path between said source node and said destination node based on said updated path quality parameters, and unicasting, by said destination node, a discovery response message to said selected source node using said selected path.

The messages or Protocol Data Units, PDUs, transmitted in the mesh network have header portion. The header portion, among others, comprises an indication of the source node and the destination node. Each node can read the header portion in order to determine whether or not the node is the intended destination node. It is noted that in a mesh network, each node could be a destination node. Therefore, a node upon determining that it is not the intended destination node for a particular path discovery message may perform a method according to the first aspect of the disclosure and upon determining that it is the intended destination node may perform a method according to the second aspect of the present disclosure.

The destination node also updates the path quality parameter based on the last hop of the path discovery message. The destination node should have, in principle, received the path discovery message over several paths as a result of the flooding nature of the BLE mesh. The message received over several path, each have an associated path quality parameter. The destination node then selects a path as being the optimal path based on the received path quality parameters. As a final step the destination node sends a unicast discovery response message to the source node. Such a discovery response message may comprise an indication of the selected path and therefore, the path to be used of future communications by the source node to the destination node.

In a third aspect of the present disclosure, there is presented an intermediary node in a mesh network arranged for supporting establishment of a path for transmitting a message in said mesh network, wherein said message is to be transmitted from a source node in said mesh network to a destination node, via one or more intermediary nodes, in said mesh network. The intermediary node comprises receive equipment arranged for receiving a path discovery message originating from said source node in said mesh network, said path discovery message comprising a path quality parameter, process equipment arranged for updating said path quality parameter based on a quality of a link associated with a node from which said intermediary node received said path discovery message, transmit equipment arranged for broadcasting said path discovery message wherein said broadcasted path discovery message comprises said updated path quality parameter.

It is noted that the advantages of the first aspect of the present disclosure being a method for supporting the establishment of a path between a pair of nodes are also associated with the third aspect of the present disclosure being the intermediary node in the mesh network.

According to an example, the process equipment is further arranged for determining a Received Signal Strength Indicator, RSSI, value for said received path discovery message, and updating said path quality parameter based on said determined RSSI value.

In an embodiment, the process equipment is further arranged for retrieving an RSSI to success probability function, wherein said function provides for a likelihood that a message is successfully received by said intermediary node over said link for a given RSSI, converting said RSSI value to a success probability using said retrieved function, and updating said path quality parameter based on said success probability.

According to an exemplary embodiment, the process equipment is further arranged for measuring a channel occupancy associated with said link, and updating said path quality parameter based on said measured channel occupancy.

According to an example the process equipment is further arranged for, determining a number of repetitions that will be used for said link, and updating said path quality parameter based on said determined number of repetitions.

According to a further example, the process equipment is further arranged for retrieving said number of repetitions that will be used for said link from said path discovery message and counting a number of repetition messages that are received across said link.

In a fourth aspect of the present disclosure, there is presented a destination node for determining a path for transmitting a message in a mesh network, wherein said message is to be transmitted from a source node to the destination node, via one or more intermediary nodes, in said mesh network. The node comprises receive equipment arranged for receiving one or more path discovery messages, wherein each of said path discovery messages comprising a corresponding path quality parameter, process equipment arranged for determining, from said received path discovery message, that said destination node is the intended destination node, and for updating said path quality parameters, for each of said received path discovery messages, based on a quality of link associated with a node from which said intermediary node received said corresponding path discovery message, select equipment arranged for selecting a path from said source node to said destination node as being the path between said source node and said destination node based on said updated path quality parameters, and transmit equipment arranged for unicasting a discovery response message to said selected source node using said selected path.

It is noted that the advantages of the second aspect of the present disclosure being a method of determining a path for transmitting a message in a mesh network, are also associated with the fourth aspect of the disclosure being a destination node for determining a path for transmitting a message in a mesh network.

In a fifth aspect of the present disclosure, there is presented a computer program product, comprising a computer readable storage medium storing instructions which when executed on at least one node of a mesh network cause said at least one node to carry out the method according to any one of the claims 1-8.

The invention according to the present disclosure is further explained with the help of drawings.

DETAILED DESCRIPTION

Figure 1:
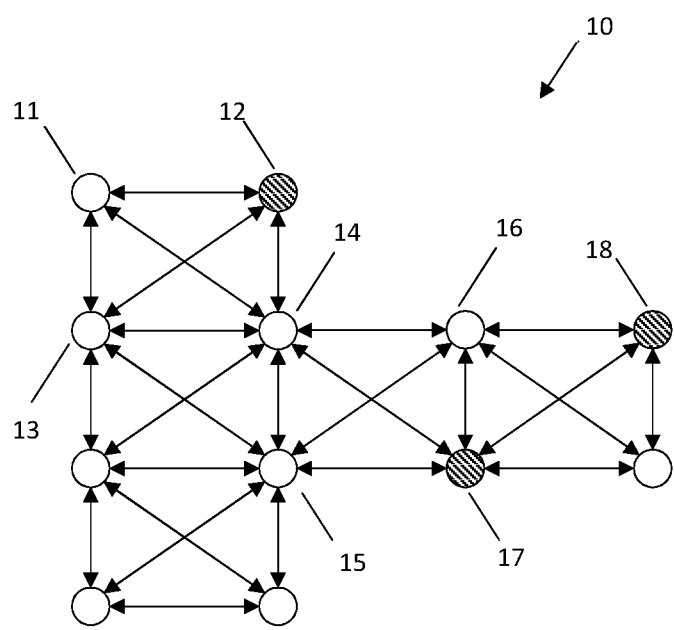
FIG. 1 schematically illustrates a mesh network.

FIG. 1 schematically illustrates a mesh network 10. The mesh network 10 is, for example, a Bluetooth Low Energy, BLE, mesh network. The mesh network 10 comprises of several nodes 11-18. A single node may also comprise of further elements. Nodes communicate with one another by sending messages in said mesh network. The messages originate from source node and are intended to be received by a destination node(s). The destination may also be a group of nodes that are collectively identified by a group address or a virtual address.

Especially in BLE mesh networks, it is conceivable that different type of nodes are part of the network. For example, node 12 is laptop having large processing power and a strong receiver. Nodes 14 and 16, for example are sensors to activate lights in a room. Such sensors are typically limited in processing capabilities and also have a weak receiver. Node 17, for example is a mobile phone with Bluetooth capability. Node 15, for example, is a low power node implementing energy harvesting techniques such that it is not always on.

For example, 11 is a source node and 18 is the destination node. Under the normal scheme of operation in BLE mesh networks, the message originating in node 11 traverses nodes 12, 14, and 16 before reaching node 18. Alternately, the message may also be routed through nodes 13, 15, 17. Other combination of nodes in order to form a route from the source node 11 to the destination node 18 may also be considered.

It is foreseen that in the future, in order to reduce the traffic in the network and to thereby decrease the probability of loss of messages due to collision, a preferred path between a pair of source and destination nodes will be established and all messages originating at the source node addressed to the destination node will take the same path. An aim of the present disclosure is to help in the establishment of such a preferred path.

Figure 2:
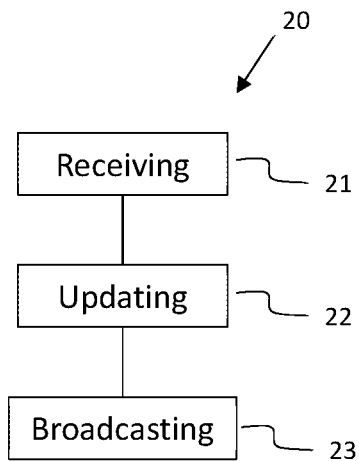
FIG. 2 schematically illustrates a method according to the present disclosure.

FIG. 2 schematically illustrates a method 20 according to the present disclosure. FIG. 2 illustrates the steps to be performed by an intermediary node in the mesh network. In the above mentioned example, wherein the source node is node 11 and the destination node is node 18, the method is performed by all other nodes, i.e. nodes 12-17, in the mesh network. In a step of receiving 21, the intermediary node, for example 14, receives a path discovery message originating from the source node 11 in said mesh network 10, said path discovery message comprising a path quality parameter. In a subsequent step of updating 22, the node 14 updates said path quality parameter based on a quality of link associated with a node 12, 13, 15 from which said intermediary node 14 received said path discovery message. In a further step of broadcasting 23, the node 14 broadcasts said path discovery message wherein said broadcasted path discovery message comprises said updated path quality parameter.

The step of updating 22, may comprise additional steps such as determining a Received Signal Strength Indicator, RSSI, value associated with an incoming message and using said RSSI value to update said path quality parameter. It may also comprise determining a probability of successful reception based on said RSSI value. Other parameters such as receiver characteristics, probability of collision, and the number of retransmissions may also be considered during the step of updating the path quality parameter.

Figure 3:
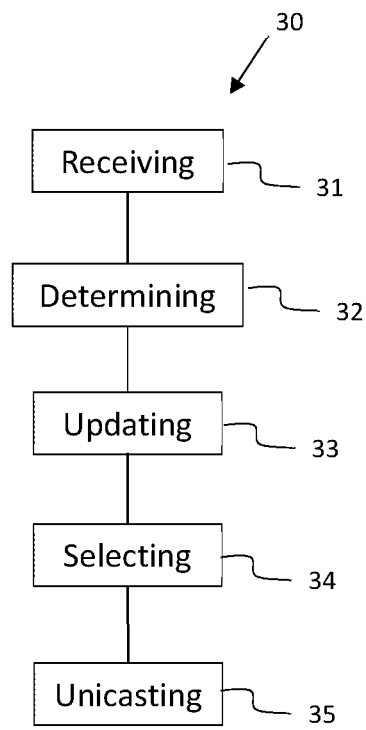
FIG. 3 schematically illustrates a method according to the present disclosure.

FIG. 3 schematically illustrates a method 30 according to the present disclosure. FIG. 3 illustrates the method to be performed by a destination node in the mesh network. Continuing with the above mentioned example, node 18 is considered as the destination node. The method 30 comprises the steps of receiving 31, by the destination node 18, one or more path discovery messages, wherein each of said messages comprises a corresponding path quality parameter. A subsequent step of determining 32, by the destination node 18, from said received path discovery message, that said destination node 18 is the intended destination node. This may be determined by the node by examining a header portion of the incoming message. If it is determined that said node is not the intended destination node, a method 20 illustrated in FIG. 2 may be performed by the node.

In a subsequent step of updating 33, the destination node 18 updates said path quality parameters, for each of said received path discovery messages, based on a quality of link associated with a node 16, 17 from which said destination node 18 received said corresponding path discovery message. In a further step of selecting 34, the destination node 18 selects a path from said source node 11 to said destination node 18 as being the preferred path between said source node 11 and said destination node 18 based on said updated path quality parameters.

For example, consider the situation wherein the destination node 18 receives two path discovery messages originating from source node 11. One of these path discovery messages was routed through nodes 12, 14 and 16 and has an associated path quality parameter p1. The other path discovery message was routed through nodes 13, 15, 17 and has an associated path quality parameter p2. The destination node compares the two parameters p1 and p2 and based on the result of the comparison selects one path as the preferred path. Consider that the parameter p1 was determined to be better after comparison.

The destination node 18 unicasts 35, a discovery response message to said source node 11 using said selected path. The discovery response message is intended to provide information regarding the selected path to the source node 11 and also the intermediary nodes 12, 14 and 16 in this case. Therefore, the source node 11 knows the route over which messages are to be sent in the future. It may be foreseen that nodes are dynamically added to the mesh network thereby altering the topology of the mesh network. Therefore the methods 20, 30 may need to be performed periodically in order to determine the optimal route in the mesh network.

Figure 4:
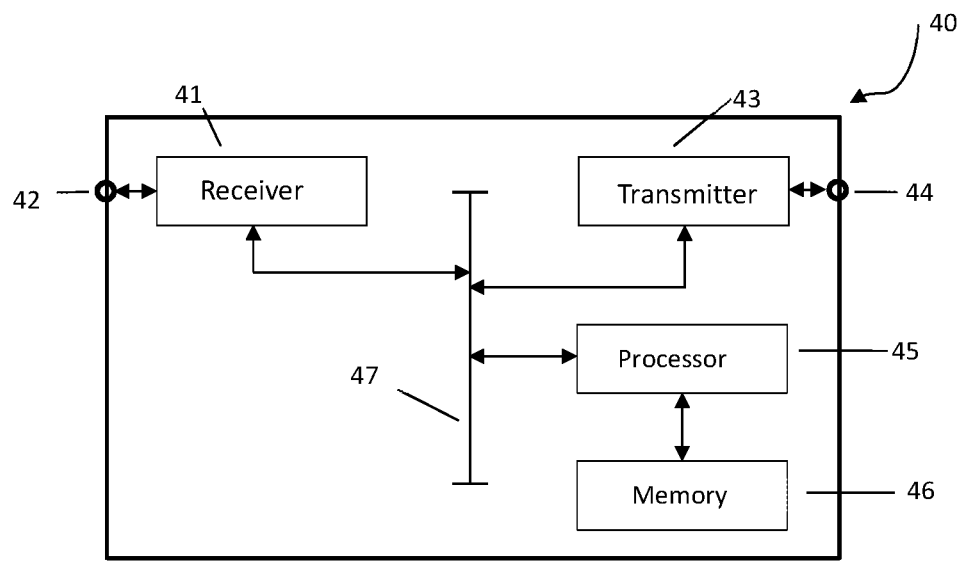
FIG. 4 schematically illustrates a mesh node according to the present disclosure.
Figure 5:
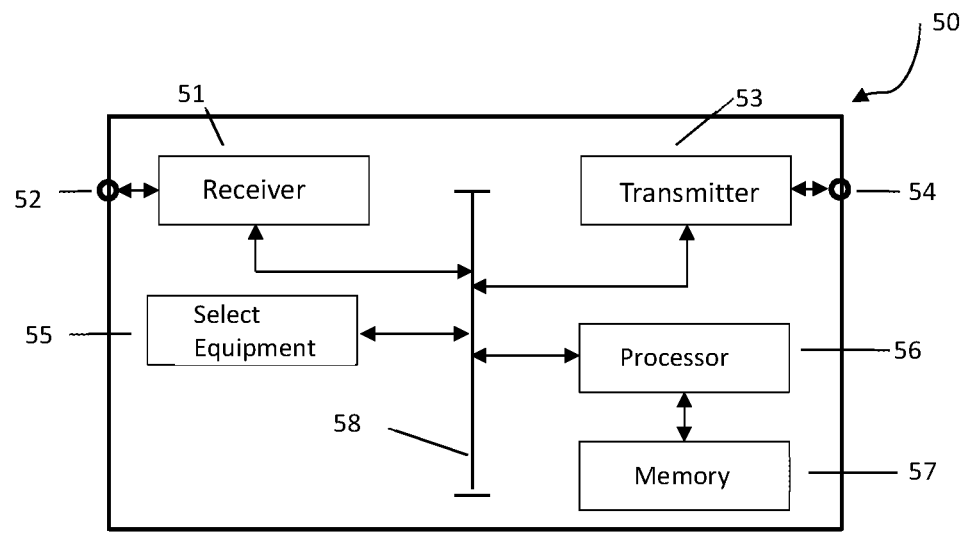
FIG. 5 schematically illustrates a mesh destination node according to the present disclosure.

FIG. 4 schematically illustrates a mesh node 40 according to the present disclosure. The intermediary node 40 comprises receive equipment 41, 42 arranged for receiving a path discovery message originating from the source node 11 in the mesh network, wherein the path discovery message comprises a path quality parameter. The process equipment 45 is arranged for updating said path quality parameter based on a quality of link associated with a node from which said intermediary node 40 received said path discovery message. It further comprises transmit equipment 43, 44 arranged for broadcasting said path discovery message wherein said broadcasted path discovery message comprises said updated path quality parameter. The node 40 also comprises a memory 46 arranged for storing a computer program product comprising a set of instructions which when executed by the processor 45 cause the node to perform a method according to the present disclosure. The internal equipments may communicate with one another using the internal bus 47;

FIG. 5 schematically illustrates a mesh destination node 50 according to the present disclosure. The destination node 50 comprises receive equipment 51, 52 arranged for receiving one or more path discovery messages, wherein each of said messages comprises a corresponding path quality parameter. The destination node 50 further comprises process equipment 56 arranged for determining, from said received path discovery message, that said destination node is the intended destination node, and for updating said path quality parameters, for each of said received path discovery messages, based on a quality of link associated with a node from which said intermediary node received said corresponding path discovery message. The process equipment 56 may also be further arranged to execute a set of instruction stored in the memory 57 which caused the node 50 to perform a method according to the present disclosure.

The destination node 50 also comprises select equipment 55 arranged for selecting a path from a source node to a destination node as being the path between said source node and said destination node based on said updated path quality parameters. The destination node 50 also comprises transmit equipment 53, 54 arranged for unicasting a discovery response message to said source node using said selected path. The person skilled in the art understands that since every node needs to be able to implement both methods according to the present disclosure, the select equipment 55 may also be incorporated in all the nodes in the network.

The method itself comprises three steps that may be performed in each node, the first step is to calculate the quality of the last hop link towards the node in question, the second is to combine this measure of link quality with the measure of the full path and the third is to propagate this measurement through the network. To calculate the quality of the last hop link, we exploit the fact that each node may have some knowledge about its own receiver characteristics. These characteristics allow us to model the receiver as a function that maps RSSI to a probability of successful packet decoding.

Within each node, the function may be implemented as a simple look-up table that maps the RSSI to success probability. This function may also be different for different nodes or different node types as it is based on characteristics of the receiver of the node, which may differ based on a number of factors, such as antennas or the quality of the receiver, as well as the transmission format (coding, modulation scheme, and frame size) being used.

Using the aforementioned function, the probability of successfully receiving a transmission over a single link, i, may be described as $$P(Success_i) = f_i(RSSI_i)$$

When the path discovery message is forwarded to the next node, the calculated success probability shall be included in the path discovery message, allowing it to be used by the next node. The next node may then calculate its own last hop success, using the same formula as previously mentioned. The probability of receiving a packet over multiple hops is then easily calculated by means of multiplication with the value from the previous node, contained in the path discovery message. This is shown as $$P_{agg}(Success_{i+1}) = f_{i+1}(RSSI_{i+1}) * P_{agg}(Success_i)$$

where $P_{agg}$ is the aggregated success probability, initialized to one (1) by the source node, i . . . , $P_{agg}(success0)=1$.

The method may then be extended to calculate the probability of successful reception over an arbitrary number of hops, as $$P_{agg}(Success_I) = \prod_{i=1}^{I} f_i(RSSI_i)$$

To find the optimal path between two nodes in a mesh network, one simply needs to select the path for which the calculated value of the success probability is the highest.

Using only RSSI as a metric for link quality may yield misleading results as the RSSI value does not take interference into account. For a system such as BLE that lacks channel coding, it is not an unreasonable assumption that a collision with another transmission will typically result in a failed decoding. Given this assumption, the probability of losing a packet due to a collision is the same as the channel occupancy. The channel occupancy can be easily measured by each node, and may then be used to adjust the calculated success probability for a given link. The following equation describes how the compensated probability is calculated, where C denotes the channel occupancy.

$$P(Success_i) = f_i(RSSI_i) * (1-C_i)$$

The probability of success for an arbitrary number of hops may then be calculated as $$P_{agg}(Success_I) = \prod_{i=1}^{I} f_i(RSSI_i) * (1 - C_i)$$

In a system, such as BLE mesh, where no per hop acknowledgements exist, transmissions may typically be repeated to increase reliability. This also means that any method that tries to estimate the quality of a link needs to take into account the number of repeat transmissions that are performed.

The number of repetitions that will be used for a link can be obtained either by including it in the path discovery message or by counting the number of messages that are received across that link. These could be path request messages, assuming that the repetition parameters are the same for the path discovery messages as for subsequent data transmissions, or repetitions of regular data transmissions. It may also use a repetition value as signaled by the provisioner node in the network. The following equation describes how the probability of success may be calculated when the received messages in link i are expected to be repeated Ni times.

$$P(Success_i) = 1 - (1 - f_i(RSSI_i))^{Ni}$$

The following equation shows the repetition compensated success probability for a link with an arbitrary number of hops.

$$P_{agg}(Success_I) = \prod_{i=1}^{I} 1 - (1 - f_i(RSSI_i))^{Ni}$$

Using the methods described in previous embodiments, the skilled person may also create a combined metric that compensates for both collisions and repetitions of transmissions. The probability of success for a link with an arbitrary number of hops may then be described by $$P_{agg}(Success_I) = \prod_{i=1}^{I} 1 - (1 - (f_i(RSSI_i) * (1 - C_i)))^{Ni}$$

Other variations to the disclosed examples can be understood and effected by those skilled in the art of practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, can be modified and enhanced by those skilled in the art beyond the scope of the present disclosure as disclosed in the appended claims without having to apply inventive skills.

The invention claimed is:

1. A method for supporting the establishment of a path for transmitting a message in a mesh network, wherein said message is to be transmitted from a source node in said mesh network to a destination node, via one or more intermediary nodes, in said mesh network, said method comprising the steps of:
receiving, by an intermediary node in said mesh network, a path discovery message originating from said source node in said mesh network, said path discovery message comprising a path quality parameter, the path quality parameter representing an aggregated probability of successful transmission of a message from the source node to a node from which the path discovery message is received, over the path taken by the path discovery message;
updating, by said intermediary node, said path quality parameter based on a quality of a link associated with the node from which said intermediary node received said path discovery message, such that the updated path quality parameter represents an aggregated probability of successful transmission of a message from the source node to said intermediary node, over the path taken by the path discovery message; and
broadcasting, by said intermediary node, said path discovery message wherein said broadcasted path discovery message comprises said updated path quality parameter.

2. The method of claim 1, wherein said step of updating comprises:
determining, by said intermediary node, a Received Signal Strength Indicator (RSSI) value for said received path discovery message; and
updating, by said intermediary node, said path quality parameter based on said determined RSSI value.

3. The method of claim 2, wherein said step of updating further comprises:
retrieving, by said intermediary node, an RSSI to success probability function, wherein said function provides for a likelihood that a message is successfully received by said intermediary node over said link for a given RSSI;
converting, by said intermediary node, said RSSI value to a success probability using said retrieved function; and
updating, by said intermediary node, said path quality parameter based on said success probability.

4. The method of claim 1, wherein said step of updating further comprises:
measuring, by said intermediary node, a channel occupancy associated with said link; and
updating, by said intermediary node, said path quality parameter based on said measured channel occupancy.

5. The method of claim 1, wherein said step of updating further comprises:
determining, by said intermediary node, a number of repetitions that will be used for said link; and
updating, by said intermediary node, said path quality parameter based on said determined number of repetitions.

6. The method of claim 5, wherein said step of determining said number of repetitions comprises either or both of:
retrieving, by said intermediary node, said number of repetitions that will be used for said link from said path discovery message; and
counting, by said intermediary node, a number of repetition messages that are received across said link.

7. The method of claim 1, wherein said path quality parameter is initially set to 1.

8. A method for determining a path for transmitting a message in a mesh network, wherein said message is to be transmitted from a source node in said mesh network to a destination node, via one or more intermediary nodes, in said mesh network, said method comprising the steps of:
receiving, by said destination node, one or more path discovery messages, wherein each of said messages comprises a corresponding path quality parameter, each path quality parameter representing an aggregated probability of successful transmission of a message from the source node to a node from which the respective path discovery message is received, over the path taken by the respective path discovery message;
determining, by said destination node, from each said received path discovery message, that said destination node is the intended destination node;
updating, by said destination node, said path quality parameters for each of said received one or more path discovery messages, based on a quality of a link associated with the node from which said destination node received said corresponding path discovery message, such that each updated path quality parameter represents an aggregated probability of successful transmission of a message from the source node to the destination node, over the path taken by the respective path discovery message;
selecting, by said destination node, a path from said source node to said destination node as being the path between said source node and said destination node based on said updated path quality parameters; and
unicasting, by said destination node, a discovery response message to said source node using said selected path.

9. An intermediary node in a mesh network arranged for supporting establishment of a path for transmitting a message in said mesh network, wherein said message is to be transmitted from a source node in said mesh network to a destination node, via one or more intermediary nodes, in said mesh network, said intermediary node comprising:
receiver circuitry configured to receive a path discovery message originating from said source node in said mesh network, said path discovery message comprising a path quality parameter, the path quality parameter representing an aggregated probability of successful transmission of a message from the source node to a node from which the path discovery message is received, over the path taken by the path discovery message;
processing circuitry configured to update said path quality parameter based on a quality of a link associated with the node from which said intermediary node received said path discovery message, such that the updated path quality parameter represents an aggregated probability of successful transmission of a message from the source node to said intermediary node, over the path taken by the path discovery message; and
transmitter circuitry configured to broadcast said path discovery message, such that said broadcasted path discovery message comprises said updated path quality parameter.

10. The intermediary node of claim 9, wherein the processing circuitry is further configured to:
determine a Received Signal Strength Indicator (RSSI) value for said received path discovery message; and update said path quality parameter based on said determined RSSI value.

11. The intermediary node of claim 10, wherein the processing circuitry is further configured to:
retrieve an RSSI to success probability function, wherein said function provides for a likelihood that said message is successfully received by said intermediary node over said link for a given RSSI;
convert said RSSI value to a success probability using said retrieved function; and
update said path quality parameter based on said success probability.

12. The intermediary node of claim 10, wherein the processing circuitry is further configured to:
measure a channel occupancy associated with said link; and
update said path quality parameter based on said measured channel occupancy.

13. The intermediary node of claim 10, wherein the processing circuitry is further configured to:
determine a number of repetitions that will be used for said link; and
updating said path quality parameter based on said determined number of repetitions.

14. The intermediary node of claim 13, wherein said processing circuitry is further configured to perform either or both of:
retrieving said number of repetitions that will be used for said link from said path discovery message;
counting a number of repetition messages that are received across said link.

15. A destination node for determining a path for transmitting a message in a mesh network, wherein said message is to be transmitted from a source node to said destination node, via one or more intermediary nodes, in said mesh network, said node comprising:

receiver circuitry configured to receive one or more path discovery messages, wherein each of said path discovery messages comprises a corresponding path quality parameter, each path quality parameter representing an aggregated probability of successful transmission of a message from the source node to a node from which the respective path discovery message is received, over the path taken by the respective path discovery message;

processing circuitry configured to determine, from each said received path discovery message, that said destination node is the intended destination node, and for updating said path quality parameters, for each of said received path discovery messages, based on a quality of a link associated with the node from which said intermediary node received said corresponding path discovery message, such that each updated path quality parameter represents an aggregated probability of successful transmission of a message from the source node to the destination node, over the path taken by the respective path discovery message, and to select a path from said source node to said destination node as being the path between said source node and said destination node based on said updated path quality parameters; and transmitter circuitry configured to unicast a discovery response message to said source node using said selected path.

* * * * *

UNITED STATES PATENT AND TRADEMARK OFFICE
CERTIFICATE OF CORRECTION

PATENT NO. : 10,972,959 B2
APPLICATION NO. : 16/093214
DATED : April 6, 2021
INVENTOR(S) : Arvidson et al.

It is certified that error appears in the above-identified patent and that said Letters Patent is hereby corrected as shown below:

In the Specification

In Column 1, Line 64, delete "mesh" and insert -- mesh. --, therefor.

In Column 2, Line 42, delete "a method a" and insert -- a method for --, therefor.

In Column 4, Line 17, delete "off collision" and insert -- of collision --, therefor.

In Column 4, Lines 27-28, delete "would be need to be distributed" and insert -- would need to be distributed --, therefor.

In Column 5, Line 12, delete "used of future" and insert -- used for future --, therefor.

In Column 6, Line 55, delete "destination may" and insert -- destination node(s) may --, therefor.

In Column 8, Line 42, delete "bus 47;" and insert -- bus 47. --, therefor.

In Column 9, Line 15, delete "look-up table" and insert -- lookup table --, therefor.

In Column 9, Lines 54-63, delete "For a . . . . . occupancy." and insert the same at Line 55, as new paragraph.

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*